United States Patent [19]
Smith

[11] 3,802,612
[45] Apr. 9, 1974

[54] GUN HOLDER OR RACK FOR VEHICLES

[76] Inventor: Jay R. Smith, 547 Whitlock St., Toledo, Ohio 43605

[22] Filed: Jan. 23, 1973

[21] Appl. No.: 326,076

[52] U.S. Cl.......................... 224/1 R, 211/8, 211/64
[51] Int. Cl............................................ B60m 11/00
[58] Field of Search.......... 224/1 R, 2 A, 2 C, 29 R, 224/42.38, 42.46 R, 42.45 R, 42.41; 211/64, 8, 9, 60 R

[56] References Cited
UNITED STATES PATENTS
| | | | |
|---|---|---|---|
| 2,929,539 | /1960 | Safreno | 224/1 R |
| 2,668,645 | /1954 | Pease | 211/64 UX |
| 1,166,781 | /1916 | Parrish | 224/2 C |

*Primary Examiner*—Gerald M. Forlenza
*Assistant Examiner*—Jerold M. Forsberg
*Attorney, Agent, or Firm*—B. P. Fishburne, Jr.

[57] ABSTRACT

A holder or rack for shotguns or the like includes a sturdy mounting bar having means for solidly securing the rack in a safe and convenient location in a police vehicle. The holder or rack will accommodate a variety of gun makes and models. A clamping and locking means is provided to prevent tampering and unauthorized removal of the weapon from the rack as well as means for disabling the weapon operating means while within the rack.

15 Claims, 9 Drawing Figures

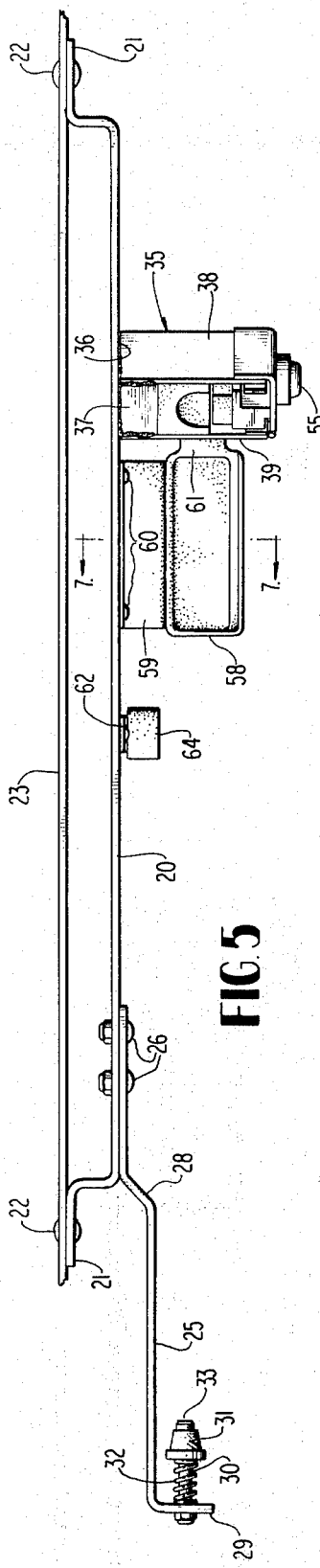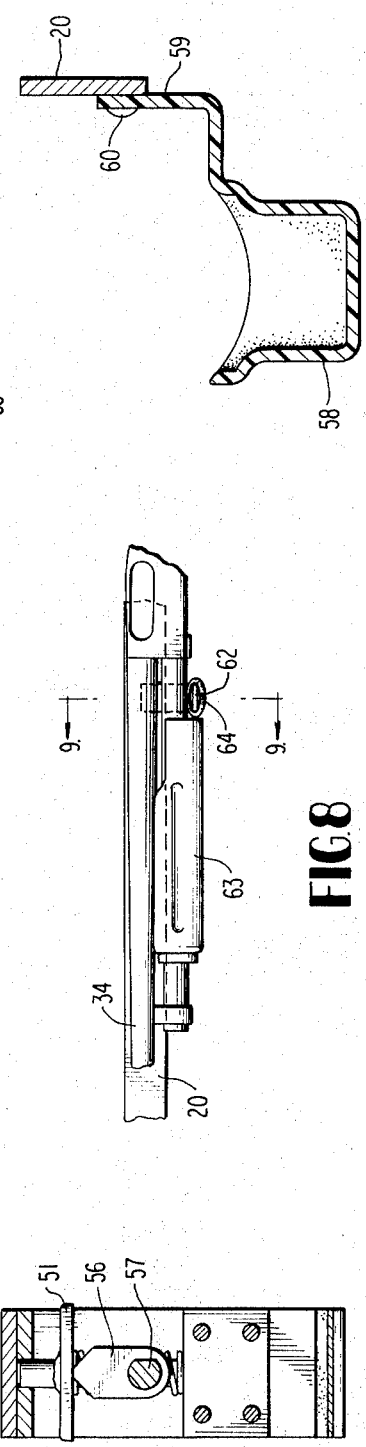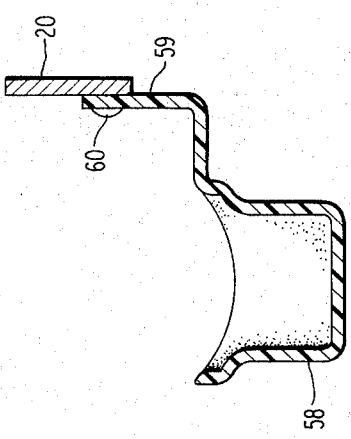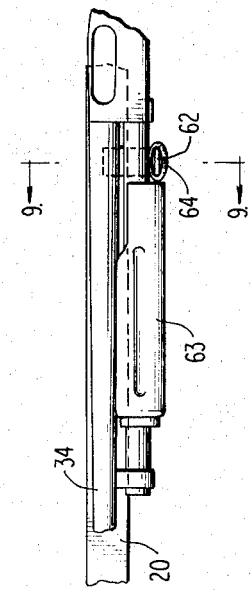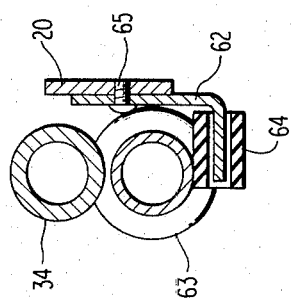

GUN HOLDER OR RACK FOR VEHICLES

BACKGROUND OF THE INVENTION

The prior art contains a number of proposals for mounting shotguns and the like in automotive vehicles for convenience and safety and to render the weapon accessible in times of need by law enforcement officers and hunters. Some examples of the patented prior art along this line are contained in U.S. Pat. Nos. 1,914,259; 2,668,645; 2,929,539 and 3,252,637. In recent years, urban police departments have increasingly equipped many of their vehicles with rifles and shotguns to cope with riot situations, bank robberies and other serious crimes. Consequently, an increasing need has developed for a secure, convenient and economical means for mounting shotguns and the like in police vehicles with safety against unauthorized usage, and in a manner which will not impede the police officer in his use of the weapon in critical situations. The prior art proposals have, in general, fallen short of satisfying the basic needs for an efficient, compact and safe mounting means for police weapons in vehicles and the present invention has for its objective to completely overcome the deficiencies of the prior art by the provision of a completely satisfactory, economical, sturdy and safe rack or holder for shotguns and the like in police cruisers or other vehicles.

More particularly, the invention provides for the mounting of most makes and models of shotguns in a convenient, out-of-the-way location in a police vehicle where the gun will not impede the vision of the driver and will present no hazard in case of collision or in any way interfere with the normal operation of conventional vehicle equipment. At the same time, the gun holder, which is extremely strong, will mount the weapon in a position for easy access and quick removal by the officer in times of need. The holder or rack is equipped with a gun locking means which will prevent tampering or unauthorized removal of the weapon and this mechanism is sufficiently simple to allow quick removal of the weapon by the police officer in a critical situation. The holder or rack also possesses means to lock the weapon against discharging or firing while in the stored position.

The invention is characterized by simplicity in that it embodies a minimum number of parts. The rack is adjustable and can be manufactured in right or left hand models, as required. So as not to damage the weapon, there are a minimum of contact points between the weapon and rack and the critical points are padded to prevent marring of the gun surfaces. Another important feature of the invention is that the locking hasp of the rack in addition to containing a key-operated lock set has a manual release means which, while simple to use when one is familiar with it, is designed to appear complicated and confuse the unauthorized user or tamperer in situations where the key lock is left unlocked by the officer. Other features and advantages of the invention will appear to those skilled in the art during the course of the following description, taken in connection with the accompanying drawings which illustrate the invention.

BRIEF DESCRIPTION OF DRAWING FIGURES:

FIG. 5 is a plan view of the holder or rack and its supporting member in the vehicle.

FIG. 6 is a vertical section taken on line 6—6 of FIG. 3.

FIG. 7 is a similar section taken on line 7—7 of FIG. 5.

FIG. 8 is a fragmentary side elevation of means provided on the rack for disabling the gun slide or pumping mechanism.

FIG. 9 is an enlarged vertical section taken on line 9—9 of FIG. 8.

DETAILED DESCRIPTION

Figure 1:
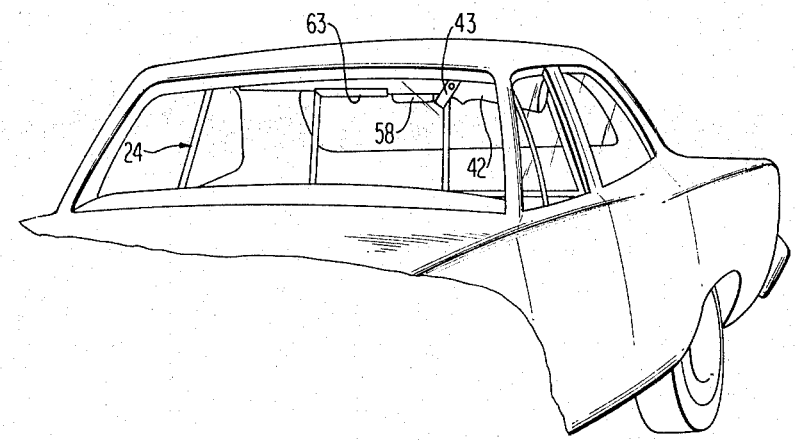
FIG. 1 is a fragmentary front perspective view of a vehicle equipped with the gun holder or rack embodying the present invention.

Referring to the drawings in detail wherein like numerals designate like parts throughout, a gun rack or holder for police vehicles and the like comprises a main mounting bar or body portion 20 formed of steel and being elongated and essentially flat and straight throughout the major portion of its length. At its opposite ends, the bar 20 has a pair of relatively short mounting feet 21 which are offset equidistantly laterally from one side of the bar to facilitate attaching by conventional fastener means 22 to a stationary support member 23 in the police vehicle. Referring to FIG. 1, the support member 23 may consist of the top generally horizontal frame member of a conventional shield 24 fixedly secured in the vehicle immediately behind the front seat so as to separate the front driver's compartment from the rear passenger compartment. Such shields in police vehicles are well-known and require no further description herein as the shield forms no direct part of the present invention. The upper frame portion 23 of the shield 24 simply forms a preferred mounting location for the gun and the gun rack embodying the invention. In this preferred mounting, the rack and gun are horizontally disposed near the roof of the vehicle on the forward side of the shield. This places the gun directly above the front seat back and substantially overhead with respect to the officer driving the vehicle or seated on the front seat thereof. However, this preferred mounting is not a limiting feature of the invention and the rack may, in some instances, be mounted vertically, for example where front bucket seats are provided in the vehicle. In fact, the rack may be mounted in any position where a suitable fixed member similar to the member 23 is available or can be made available in the vehicle.

Figure 2:
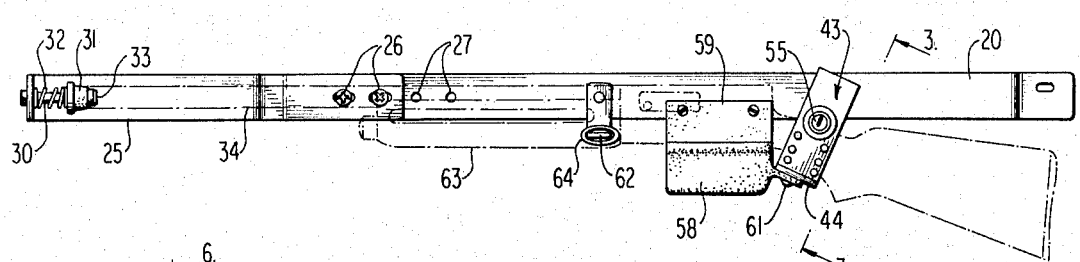
FIG. 2 is a side elevation of the rack in the locked gun holding position, a typical shotgun being shown in phantom lines.

The rack additionally comprises a longitudinal extension bar 25 adjustably mounted on the main bar or body portion 20 by a pair of bolts 26 or the like. Preferably, the bar 20 contains at least one extra pair of openings 27, FIG. 2, capable of receiving the bolts 26 and this enables the extension bar 25 to be adjusted so as to change the overall length of the rack to accommodate various lengths of gun barrels. As shown, the extension bar 25 is laterally offset at 28 from the main bar 20 and is spaced from the side of the bar 20 remote from the mounting feet 21, in parallel relation to the bar 20 and feet. At its leading end, the extension bar 25 has a short right angular flange 29 projecting away from the main bar 20 and fixed to this flange in parallel relation to the bars 20 and 25 is a guide rod 30 for a conically tapered gun barrel plug 31 which is adapted to enter the muzzle end of the gun barrel during use. The plug 31 is biased rearwardly on the rod 30 by a compression spring 32 and has its rearward movement limited by an enlarged head 33 on the rod 30. The plug 31 is shiftable forwardly against the force of spring 32 when a gun is placed in the rack or holder so that the plug may properly enter the muzzle end of the gun barrel 34 as depicted in FIG. 2. The barrel plug 31 is preferably a non-metal element and may be conveniently formed from molded nylon or some other tough plastic.

Toward the rearward end of the main bar 20 of the rack, an essentially U-shaped gun stock rest 35 is fixedly secured by welding at 36 to the outer face of the main bar 20. As best shown in FIG. 2, the rest 35 is set at an oblique angle to the bar 20 and the heavy base block 37 of the rest extends considerably below the lower edge of the bar, FIG. 3. The gun stock rest 35 further includes sturdy side plates 38 and 39 welded to the block 37 at right angles thereto and projecting outwardly from the adjacent side of the main bar 20. A thick cushion block 40 of rubber-like material is adhesively secured to the block 37 and inner faces of side plates 38 and 39, and this cushion block is recessed at 41 to receive the small of the gun stock 42 which is approximately elliptical in cross section, FIG. 3.

Figure 3:
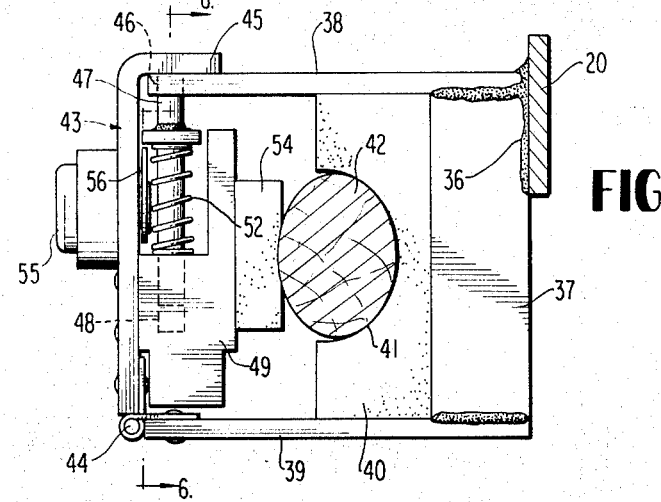
FIG. 3 is an enlarged cross sectional view taken on line 3—3 of FIG. 2.

An L-shaped locking hasp 43 is hingedly secured at 44 to the end of side plate 39 and includes a transverse end portion 45 which overlaps the outer face of the other side plate 38 when the hasp is closed, FIG. 3. Such other side plate 38 has an aperture 46 near its end to receive a reciprocatory locking bolt 47 carried by the hasp 43 on the interior side thereof. The bolt 47 is in the form of a cylindrical rod which is received in a guide bore 48 of a bolt mounting block 49 suitably rigidly secured to the interior side of the hasp 43. The mounting block 49 has a plate extension 50 of reduced thickness which partly covers the interior side of the bolt 47 and partly conceals the bolt when the hasp is swung open. The bolt near its leading end carries a crosshead or plate 51 extending on opposite sides of the bolt and being approximately equal in length to the width of the hasp. This crosshead is engaged by the fingers to retract the bolt 47 into the bore 48 against the force exerted by a compression spring 52 which surrounds the bolt between the crosshead 51 and the opposing face 53 of mounting block 49. The rectangular crosshead 51 lies close to the inner face of the hasp 43 and projects equidistantly from opposite sides of the bolt, FIG. 6, for ease of grasping with the fingers. The closeness of the crosshead 51 to the hasp 43 prevents the bolt 47 from rotating appreciably on its axis.

Figure 4:
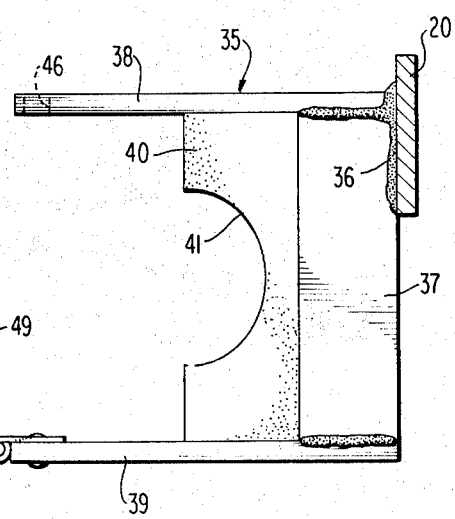
FIG. 4 is a view similar to FIG. 3 showing the locking hasp in the open position and the manual bolt retracted.
Figure 4:
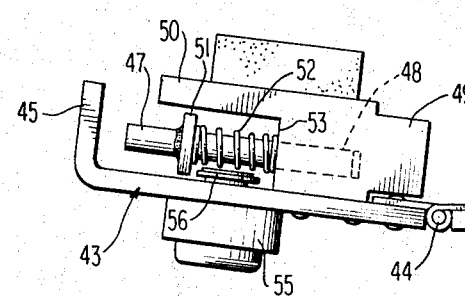

When the hasp 43 is closed, the bolt 47 may enter the aperture 46 of side plate 38 to securely lock the hasp in the gun holding position. At this time, a resilient rubber-like pad 54 adhesively mounted on the interior face of block 49 presses against the stock 42 of the gun to seat the latter firmly in the recess 41 of cushion block 40. The hasp 43 additionally has a key-operated lockset 55 fixed to its outer side including a rotary locking finger 56 mounted upon the lock tumbler shaft 57 which responds to turning with a key. The finger 56 is a thin plate-like element, FIG. 3, which lies immediately inwardly of the hasp and close to the bolt 47. When turned to the locking position shown in FIGS. 3 and 6, the finger 56 blocks the movement of the crosshead 51 and therefore prevents retraction of the bolt 47 against the force of spring 52 and prevents opening the hasp. When the element 56 is turned 90 degrees by use of a key so that it is parallel to the crosshead 51, as shown in FIG. 4, the bolt 47 is easily retractable by finger action so as to disengage the aperture 46 and release the hasp for hinging movement to the open position.

A feature of the construction of the hasp and locking bolt means lies in the fact that an unauthorized person, such as a criminal acting in haste, would be very likely not to understand how to release the hasp even if the police officer left the key-operated element 56 in the release position. The construction of the bolt and its mounting means, while actually very simple, is sufficiently complicated in appearance to baffle an inexperienced intruder and discourage him from tampering with the mechanism. On the other hand, authorized persons familiar with the mechanism could easily retract the bolt 47 even in a panic situation. A further feature of the invention is that the locking means shown particularly in FIGS. 3 and 4 is extremely strong in construction and therefore very effective in preventing unauthorized separation of the gun from the rack or holder.

Additionally, the invention comprises a preferably plastic generally rectangular elongated cup-like protector 58 which fits over and encloses the entire trigger and trigger guard region of the gun, including the gun safety. The protector 58 is sufficiently large to receive the trigger guard on the various types of shotguns and the like which the rack is adapted to hold. The protector 58 has an L-shaped side flange 59 which is fixedly secured at 60 to the main plate 20. Another flange 61 on one end of the protector is secured firmly to the side plate 39 of the gun stock rest 35. A further feature of the invention resides in the provision on the main bar 20 of an adjustable and lockable L-shaped stop element 62 for the slide or pump element 63 of the shotgun. The stop element 62 has a tubular resilient pad 64 thereon to prevent marring the pump element 63. When properly adjusted as illustrated in FIG. 8, the stop element 62 will prevent the rearward displacement of the gun pump element while the gun is mounted in the rack or holder. This feature, coupled with the engagement of the plug 31 in the gun barrel and placing the safety of the gun in the on position, renders the gun impossible to fire while in the rack and renders it tamper-proof. In connection with guns which do not possess the pump element 63, the stop element 62 may be turned upwardly 180° and locked by the screw 65, FIG. 9, so as to be out of the way. If desired the element 62 may be removed from the bar 20 in some cases. The protector 58 is also designed to fit over the levers of certain lever-actuated guns, as distinguished from pump guns.

In light of the above detailed description, the use or operation of the rack in connection with the secure mounting of a shotgun or like weapon and the ready release thereof for use by the policeman is believed to be quite clear without the need for further description. Suffice it to say that the gun is supported firmly at the stock near its center of gravity by the rest 35 and clamping hasp 43. While so clamped, the gun cannot move fore or aft in the rack. The barrel plug 31 adds additional support and stability at the muzzle end of the barrel. When the hasp 43 is unlocked and opened, the user of the gun can quickly remove it from the rack and there are no parts arranged to block or interfere with the removal. The support for the gun is essentially a simple two point support or suspension at the small of the stock and muzzle end of the barrel, plus the added contact at the padded stop element 62. The numerous advantages and features of the device over the known prior art are thought to be amply clear.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A gun holder for vehicles comprising a main mounting bar adapted for attachment to a stationary structural part of the vehicle, a gun stock rest secured to the main mounting bar and having a gun stock engaging seat, a hinged locking hasp on said rest swingable between gun holding and gun release positions, a reciprocatory bolt means on said hasp and received by a locking aperture in said rest when the hasp is in said gun holding position, a key-operated locking means for said bolt including a rotatable blocking means on said hasp and blocking retraction of the bolt when said means is locked and allowing manual retraction of the bolt when said means is unlocked, said hasp including a part to engage a gun stock at the side of the stock opposite from said seat when the hasp is in said gun holding position, and a gun barrel support and stabilizing plug on the main mounting bar in spaced relation to said rest.

2. The structure of claim 1, and a pair of attachment feet secured to opposite ends of the main mounting bar and being offset laterally from one side of the bar, an extension bar secured adjustably to the other side of the main mounting bar and being parallel therewith and offset laterally from said other side, said barrel support and stabilizing plug secured to the extension bar.

3. The structure of claim 2, and a right angular flange on one end of th extension bar projecting away from the main mounting bar, a guide rod carried by said flange and projecting rearwardly thereof and being parallel to the main mounting bar, said barrel support and stabilizing plug slidably mounted on said guide rod for axial movement, and a spring on the guide rod between said plug and flange and yieldingly resisting movement of the plug forwardly toward said flange.

4. The structure of claim 3, and said plug comprising a non-metal conically tapered plug.

5. The structure of claim 1, and said gun stock rest comprising a substantially U-shaped rest rigidly secured to one face of the main mounting bar at an oblique angle thereto near one end portion of the main mounting bar and extending laterally beyond one longitudinal edge of the main mounting bar and having its open side facing away from the plane of the main mounting bar.

6. The structure of claim 5, and said hasp being hinged to one side wall part of said gun stock rest and adapted to extend completely across the open side of said rest when in said gun holding position, a mounting block for said bolt means on the interior side of said hasp including a guide bore for the bolt means parallel to the hasp and an extension spaced from the hasp and parallel therewith and forming with the hasp a partial enclosure for the bolt means, said mounting block entering between the side wall parts of said rest when said hasp is in said gun holding position.

7. The structure of claim 6, and said bolt means comprising a reciprocatory bolt slidably engaged within said guide bore and having a finger-engaging crosshead near its leading end, a compression spring surrounding said bolt between said crosshead and an opposing face of said mounting block, one side wall part of said rest having a locking aperture receiving the forward end of said bolt, said key-operated locking means including a turnable element on the interior side of said hasp adapted to block retraction of said crosshead in one position and to allow said retraction in another position at ninety degrees to said one position.

8. The structure of claim 7, and said locking means comprising a key-operated lockset secured to said hasp intermediate its ends and opposite from said extension of said mounting block for said bolt means.

9. The structure of claim 6, and gun stock cushioning elements on the interior of said rest and on the opposing side of said mounting block to grippingly secure said gun stock when said hasp is locked in said gun holding position.

10. The structure of claim 9, and at least one of said cushioning elements being recessed to receive said stock and the face of said recess conforming to the cross sectional shape of the stock.

11. The structure of claim 7, and said hasp having a lateral flange at its leading end adapted to overlie and conceal said locking aperture in said one side wall part of the rest when the hasp is in said gun holding position.

12. The structure of claim 5, and a trigger guard enclosing cup-like protector including a first extension anchored to the base of said gun stock rest and a second extension anchored to said main mounting bar.

13. The structure of claim 12, and a stop element secured adjustably to the main mounting bar forwardly of said protector to disable the slide mechanism of a gun within said holder.

14. The structure of claim 13, and said stop element comprising an L-shaped element pivotally and clampingly secured to said main mounting bar and having a resilient cushioning part to contact said gun slide mechanism to prevent marring of the same.

15. The structure of claim 1, and an adjustable stop element on said main mounting bar forwardly of said gun stock rest and engageable with the slide mechanism of a gun within said holder to disable the slide mechanism.

* * * * *